UNITED STATES PATENT OFFICE.

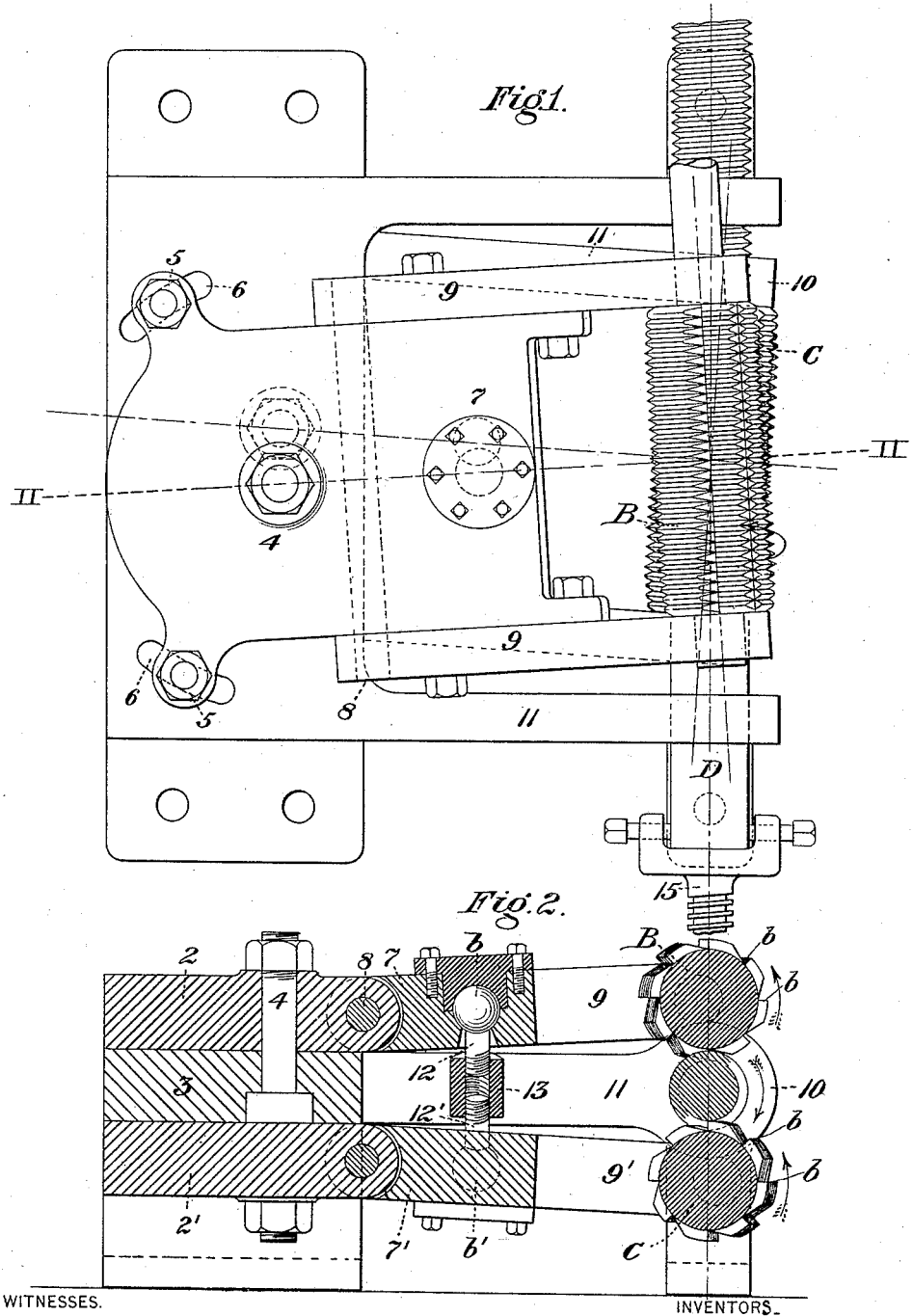

HENRY H. FORSYTH AND HENRY H. FORSYTH, JR., OF CHICAGO, ILLINOIS.

APPARATUS FOR CUTTING SCREW-THREADS.

SPECIFICATION forming part of Letters Patent No. 452,839, dated May 26, 1891.

Application filed February 19, 1889. Serial No. 300,412. (No model.)

*To all whom it may concern:*

Be it known that we, HENRY H. FORSYTH and HENRY H. FORSYTH, Jr., of Chicago, in the county of Cook and State of Illinois, have invented a new and useful Improvement in Apparatus for Forming Screw-Threads, of which the following is a full, clear, and exact description.

Our invention is illustrated in the accompanying drawings, in which—

Figure 1 is a plan view of our improved apparatus. Fig. 2 is a vertical cross-section on the line II II of Fig. 1.

Like symbols of reference indicate like parts in each.

In the drawings, B and C represent rotary cutters made in the form of cylinders having parallel peripheral ribs or teeth which are preferably serrated with teeth or notches $b$, so that each rib shall be in effect a circular saw. The mechanism by which these cutters are rotated is not shown in the drawings, since any ordinary and well-known mechanical power devices may be employed for this purpose. The cutters are journaled at the ends of adjustable frames, which are similar in construction and arrangement, and are situated at a little distance from each other, so as to permit the interposition of the blank on which the screw-thread is to be formed.

We shall first describe the upper one of the two frames, and shall then refer, generally, to the lower frame, the parts of which are, for convenience in reference, marked with the same reference-figures as the corresponding parts of the upper frame, but are distinguished therefrom by the use of the prime (') mark. The upper frame consists of two parts, one of which is the part 2, set on the bed-plate 3 of the machine and confined thereto by a vertical bolt 4, on which it is axially movable.

5 are set-bolts secured to wings of the part 2, and working in circular slots 6 in the bed-plate 3, so as to permit the part 2 to be fixed when it has been moved radially on the bolt 4, to the desired position. The second part 7 of the frame is pivotally joined to the part 2 by means of a hinge connection 8, and is provided with parallel side bars 9, at the ends of which are the bearings for the cylindrical cutter B. The blank D, on which the screw-thread is to be cut, is held in position between the cutters B and C by holders 10 at the ends of arms 11, projecting from the bed 3 of the machine, and, if desired, other supplementary holding devices may be employed. The frame 7' on the lower cutter is connected with the frame of the upper cutter by means of rods 12 and 12', having at their ends ball-shaped heads $b$ and $b'$, which fit in correspondingly-shaped sockets in the frames, and the inner ends of these rods are connected by a sleeve-nut 13, by the adjustment of which the rods may be drawn together in order to lessen the distance between the frames, or may be separated, so as to cause the frames to diverge, as will be readily understood.

The operation of the apparatus in the formation of screw-threads is as follows: The blank D is placed between the cutters B and C, (after it has been heated to a proper temperature, though it may be cut cold,) and the cutters, having been adjusted by turning their frames so that their axes shall be inclined at equal opposite angles to the blank, are brought into contact with the latter by adjustment of the sleeve-nut 13, and are rotated while in contact therewith. By driving the cutters in the direction of the arrows in Figs. 1 and 2, inclined grooves are formed on the surface of the blank, and by feeding the blank longitudinally between the cutters and imparting to it a rotation on its longitudinal axis, the grooves will be caused to assume a spiral form and to constitute a screw-thread. In order to cause the longitudinal and axial motions of the blank to conform properly to the inclination of the cutters, we prefer to hold the blank by a feeding-rod 15, having a clutch at the end for attachment to the blank, and provided with a threaded portion, which fits within a nut, (not shown,) the pitch of the threads on the rod and nut being the same as the pitch of the thread to be formed on the screw, so that by turning the feed-rod within the nut the blank is fed to the cutters in the proper manner to form a perfect thread thereon. In order to adjust the cutters with accuracy to adapt them to the production of a screw-thread of a certain pitch, we take a screw which has already been formed, of substantially the diameter, and with a thread of substantially the pitch desired, and place it between the cutters B and C, and by means of the several adjusting-screws shown in the drawings and already described, we adjust the cutters so as to bring them exactly to the relative positions required to cause their peripheral teeth to fit in the thread of the interposed screw. This screw may then be removed from the cutters by rotating it between the latter, and the cutters will be in proper adjustment to manufacture screws of the desired shape and size. The teeth may be shallower at the ends of the rolls, as shown in Fig. 2, producing a tapering portion thereat, which serves to drag the blank into the machine.

The advantages of our invention will be appreciated by those skilled in the art. It enables the rapid and economical formation of screw-threads on blanks, and obviates all the difficulties which have been incident to prior apparatus of the same general character.

The cutters may be used to form either right or left hand threads by a simple change in adjustment of the cutters, as will be readily understood.

Our improved apparatus may be modified by those skilled in the art to effect the same result as we have described in substantially the same way without involving a departure from the principles of our invention as stated in the following claims. For example, the shape of the teeth or tongues on the cutters may be varied according to the shape of the thread desired to be produced.

Instead of making each of the cutters in one solid piece, as we have shown and described, a number of circular disks may be placed side by side on a central shaft, so as to constitute a sectional cutter. The driving and adjusting mechanism of the cutters may also be modified in various ways by those skilled in the art.

We do not limit ourselves to the use of two cutters B and C, since, if desired, by suitable modifications in the apparatus such as will suggest themselves to those skilled in the art, the apparatus may be used with but one serrated cutter, the other being replaced by a suitable dummy or other support.

We claim—

1. In apparatus for forming screw-threads, a holder adapted to support the blank in suitable position and a roll having peripheral teeth and axially inclined to the position of the blank in the holder, substantially as described.

2. In apparatus for forming screw-threads, a holder adapted to support the blank in suitable position and a roll having parallel peripheral serrated teeth and axially inclined to the position of the blank in the holder, substantially as described.

3. In apparatus for forming screw-threads, rotatory rolls or cutters having series of parallel peripheral serrated teeth, said rolls being axially inclined to each other, and frames in which the rolls or cutters are journaled, said frames being radially movable and adjustable to vary the inclination of the cutters with the blank, substantially as and for the purposes described.

4. In apparatus for forming screw-threads, rotatory rolls or cutters having series of peripheral parallel teeth, said rolls being axially inclined to each other, and frames in which the rolls or cutters are journaled, said frames being radially movable and adjustable to vary the inclination of the cutters with the blank, and provided with adjusting mechanism by which the frames are separable, substantially as and for the purposes described.

5. In apparatus for forming screw-threads, a rotatory cutter having its axis of rotation inclined to the axis of the blank, substantially as and for the purposes described.

6. In apparatus for forming screw-threads, a series of rotatory cutters having a common axis of rotation, which is inclined to the axis of the blank, substantially as and for the purposes described.

In testimony whereof we have hereunto set our hands this 13th day of Februrary, A. D. 1889.

HENRY H. FORSYTH.
HENRY H. FORSYTH, JR.

Witnesses:
WM. P. DICKINSON,
WILLIAM DICKINSON.